United States Patent [19]
Douglas

[11] Patent Number: 6,055,374
[45] Date of Patent: Apr. 25, 2000

[54] FOLDING CAMERA

[75] Inventor: Lawrence M. Douglas, So. Easton, Mass.

[73] Assignee: Polaroid Corporation, Cambridge, Mass.

[21] Appl. No.: 09/174,779

[22] Filed: Oct. 19, 1998

[51] Int. Cl.[7] .................................................. G03B 17/24
[52] U.S. Cl. ............................ 396/30; 396/348; 396/351
[58] Field of Search ................................ 396/30, 348, 351

[56] References Cited

U.S. PATENT DOCUMENTS

| | | |
|---|---|---|
| 4,104,660 | 8/1978 | Norris ........................................ 396/30 |
| 5,805,936 | 9/1998 | Matsuzaki et al. ........................ 396/30 |

*Primary Examiner*—David M. Gray
*Attorney, Agent, or Firm*—Leslie Payne

[57] ABSTRACT

A foldable camera having a base housing containing a self-developing film unit, and an upper housing including an objective lens. The housings extend generally parallel to each other, and in the folded inoperative position, the upper housing overlies and engages the lower housing forming a compact unit. In moving between the folded and unfolded positions, the upper housing moves through planes generally parallel to the base housing, such action being provided by a linkage. A foldable flash unit is movable between a folded inoperative position extending over the upper housing and covering the objective lens, and an unfolded position projecting above the upper housing to expose a flash. In one preferred embodiment, a viewfinder housing is mounted by a linkage to the upper housing for movement between a folded inoperative position extending in a passage formed in the upper housing and an unfolded operative position projected above and extending generally parallel to the upper housing and exposing a viewfinder lens located in the viewfinder housing.

20 Claims, 6 Drawing Sheets

FOLDING CAMERA

BACKGROUND OF THE INVENTION

The present invention relates generally to folding photographic apparatus and, in particular, to folding cameras typically having a plurality of housing members mounted for movement between a folded inoperative position and an unfolded operative position.

In the field of photography, folding the optical path from the taking lens to the focal plane is a known approach for achieving compact camera configurations. Of course, numerous cameras of this type exist in the prior art. Examples of cameras in the field of instant photography are represented by U.S. Pat. Nos.: 2,880,659 issued to Land et al.; 3,589,253 issued to Erlichman; 3,610,123 issued to Bellows; 3,709,130 issued to Douglas; 3,832,726 issued to Finelli; 4,387,978 issued to Pizzuti; 4,723,140 issued to Whiteside et al.; 5,027,142 issued to Douglas; 5,151,728 issued to Hendry et al; and 5,687,411 issued to Matsuzaki et al. As evident from the foregoing, a variety of camera erecting systems exist for facilitating optical path folding as well as movement of the housing assemblies of the cameras. Despite numerous advantages offered thereby, particularly in the field of instant photography, a desire nevertheless exists for further improvements. In this regard, for instance, with conventional folding cameras the various components thereof which perform the image viewing and capturing functions, must reestablish a predetermined geometrical relationship in order to perform optimally every time the components are erected. However, maintaining such geometrical relationships is subject to variances because of tolerance deviancies between the components that may arise from manufacturing or from repeated use. Clearly, the more components which must move in order to reestablish the desired optical geometrical relationships during erection, the greater the likelihood of inaccuracies. It is therefore, highly desirable to provide a compact and cost efficient camera which minimizes such inaccuracies.

SUMMARY OF THE INVENTION

In accordance with the present invention, provision is made for an illustrated and preferred embodiment of a photographic apparatus comprising a base housing containing a compartment for holding a film unit, preferably a self-developing film unit, and an upper housing including an objective or taking lens. The base and upper housings extend generally parallel to each other whether in the inoperative or operative conditions. In the folded or inoperative conditions, the upper housing overlies and engages the top of the lower housing forming a compact photographic apparatus. In moving between the folded and unfolded conditions, the upper housing moves through planes generally parallel to the base housing. This generally parallel displacement is provided by a linkage means pivotally connected to and between the base and upper housings. A foldable strobe or flash unit is associated with the upper housing and is also movable between a folded or inoperative condition, whereby it extends over the upper housing and covers the objective lens at the front of the upper housing, and an unfolded condition whereby it projects above the upper housing to expose the objective lens.

In the preferred embodiment, a viewfinder assembly is pivotally mounted by means of a linkage assembly to the upper housing for movement between a folded or inoperative condition, where it extends in an opening formed in the upper housing for an unfolded or operative condition where it extends generally parallel to the upper housing and exposing a viewfinder lens. In this embodiment, the viewfinder is parallel relationship to the taking lens.

An object of the present invention is to provide a novel and improved folding camera which is highly compact in the folded position and yet may be easily and smoothly erected into the operative position without sacrificing performance of the camera.

Another object of the present invention is to maintain the operative geometric relationship of various components of the camera including optical components so that such components are less sensitive to folding and erecting relationships, thereby maintaining a parallel relationship between the taking optics and the film.

Another object is to facilitate having each of the taking lens, strobe and viewfinder assemblies movable, relative to each other between erect and collapsed conduit. Included herein is the provision of such a camera that may incorporate a self-developing film unit and yet at the same time possess a highly compact construction capable of being readily unfolded and folded between operative and inoperative positions.

The above and further objects and scope of the present invention will become apparent following a reading of a detailed description of the invention when taken in conjunction with the accompanying drawings wherein like parts are indicated by like reference numerals throughout the several views.

Other objects and features of the present invention will become apparent from the following more detailed description taken in conjunction with the attached drawings in which:

DETAILED DESCRIPTION

Figure 1:
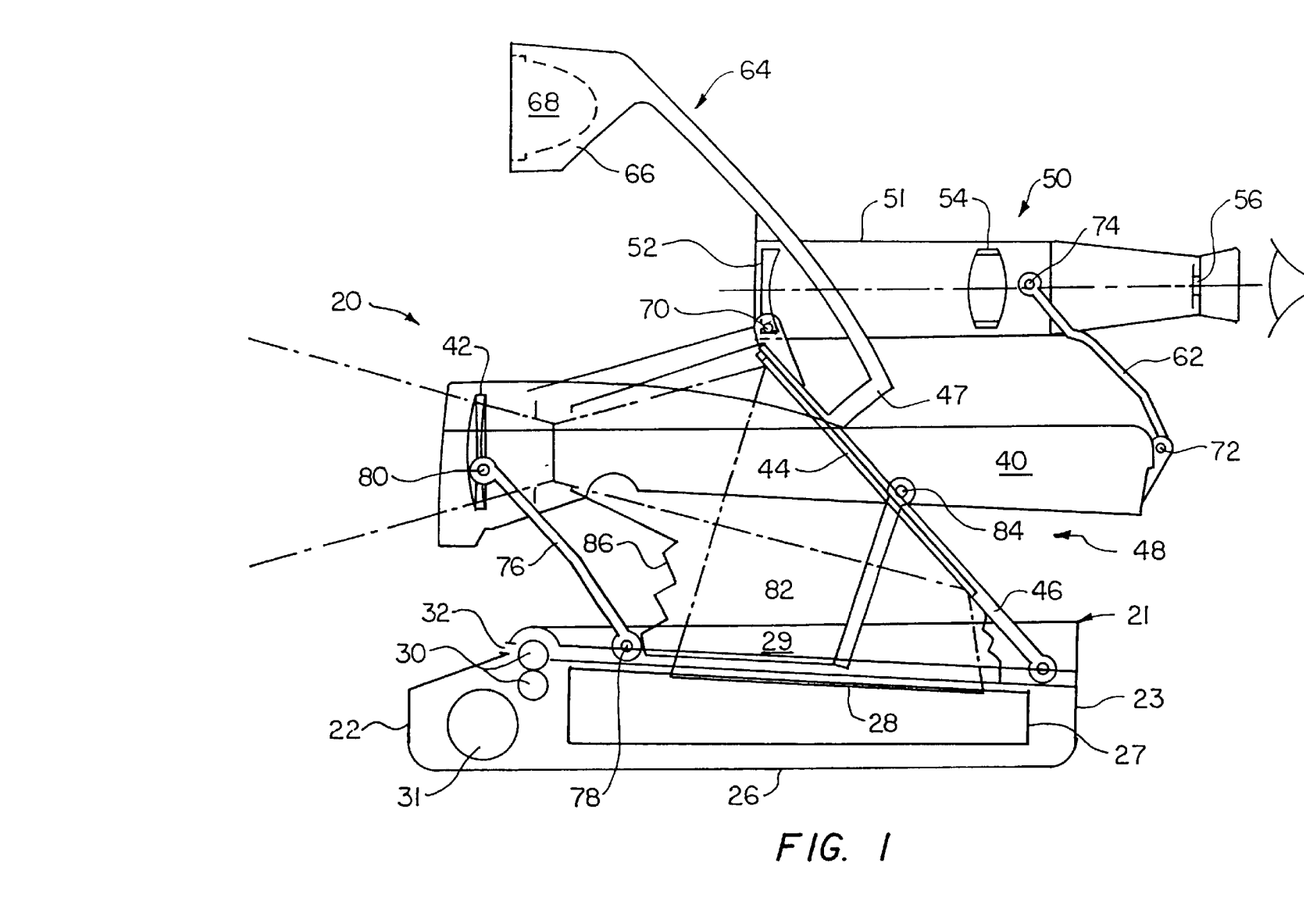
FIG. 1 is a side elevation diagrammatic view of a camera constituting one preferred embodiment of the present invention shown in the unfolded operative position with certain parts removed for purposes of clarity.
Figure 2:
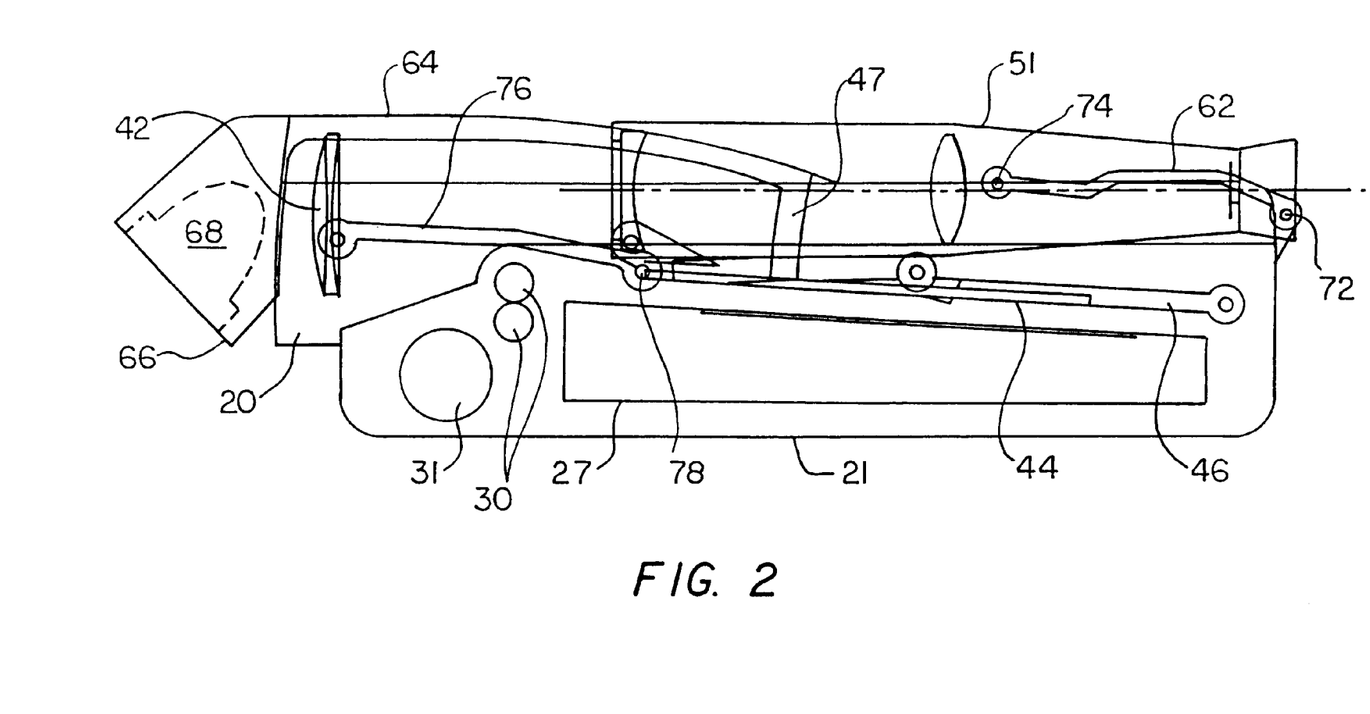
FIG. 2 is a view generally similar to FIG. 1 except showing the camera in the folded inoperative position.
Figure 3:
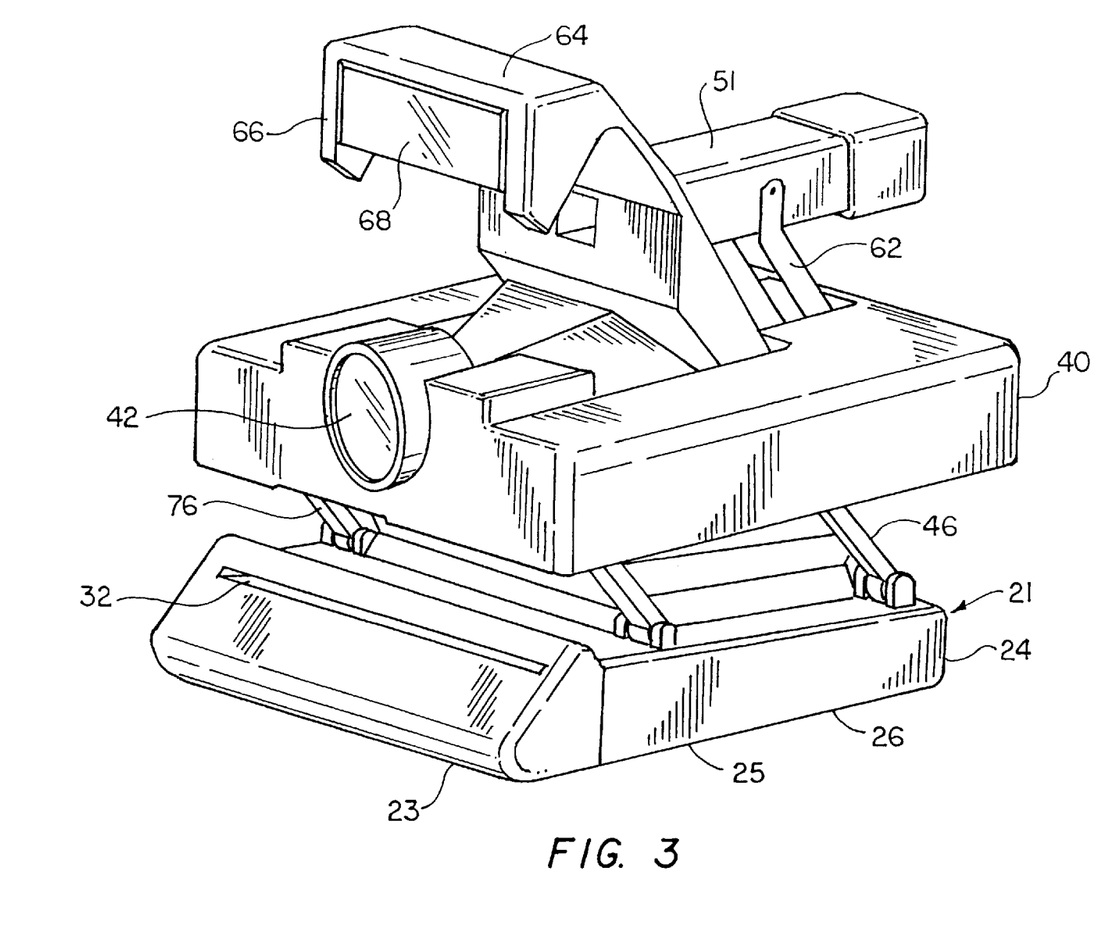
FIG. 3 is a perspective view of the camera shown in the unfolded operative position.

Referring now to the drawings in detail, there is shown for illustrative purposes in FIGS. 1–3, one preferred embodiment of the present invention. The folding camera 20 of the present invention includes a lower or base housing 21 having a generally rectangular parallelepiped configuration which may be formed from any suitable material, for example molded plastic, and includes opposite front and rear walls 22, 23 and opposite side walls 24, 25 upstanding from a bottom wall 26. The side wall 25 is hinged and latched to allow for insertion or loading of a film cassette 27 containing a plurality of film units 28 of the self-developing type within a film compartment 29 as well as the retention thereof. The film units 28 are of the diffusion transfer type that is commercially available from Polaroid Corporation. Included in the base housing 21 is a pair of spread rolls 30 that are driven by a motor 31. The spread rollers facilitate transferring the film unit 28 from the film plane in the cassette to the exterior of the base housing 21 camera through an exit slot 32 in the front wall 22 and in the process initiate development of the latent images formed. The film unit is subject to a diffusion transfer process that is initiated as the film unit passes through the rollers in a well-known manner.

Above the base housing 21 and extending generally parallel thereto is what is termed an "upper housing" 40 also having a generally U-shaped and parallelepiped configuration which may be from molded plastic or any other suitable material whose dimensions are generally comparable to those of the base housing. The upper housing 40 is mounted for movement to the base housing 21 between a folded inoperative position shown in FIGS. 2 and 4, where it is engaged upon the base housing in a nested relationship so as to extend generally parallel and coextensive thereto and an unfolded or erect operative position where it is projected above the base housing as shown in FIGS. 1 and 3, but continues to extend generally parallel thereto. In FIG. 1, the upper housing 40 is not only projected above the base housing; it is also projected slightly rearwardly of the base housing 21.

The upper housing 40 includes an objective or taking lens 42. Within the upper housing 40 immediately behind the objective lens 42 is a shutter mechanism (not shown) for automatically regulating the transmission of imagebearing light rays through the objective lens 42 to the film which extends in the film cassette in a generally horizontal plane. An example of a shutter mechanism of this type is described in U.S. Pat. No. 3,936,843 issued to I. Erlichman, while an example of an exposure control system incorporating such a shutter mechanism is described in U.S. Pat. No. 4,894,678 issued to D. Farrington et al. An optical path is formed through the objective lens 42 to the film by means of a reflecting mirror 44 held in the preferred embodiment by a rear mounting wall link 46, which will be described further below to serve as a link in the linkage assembly 48 of the present invention.

Figure 4:
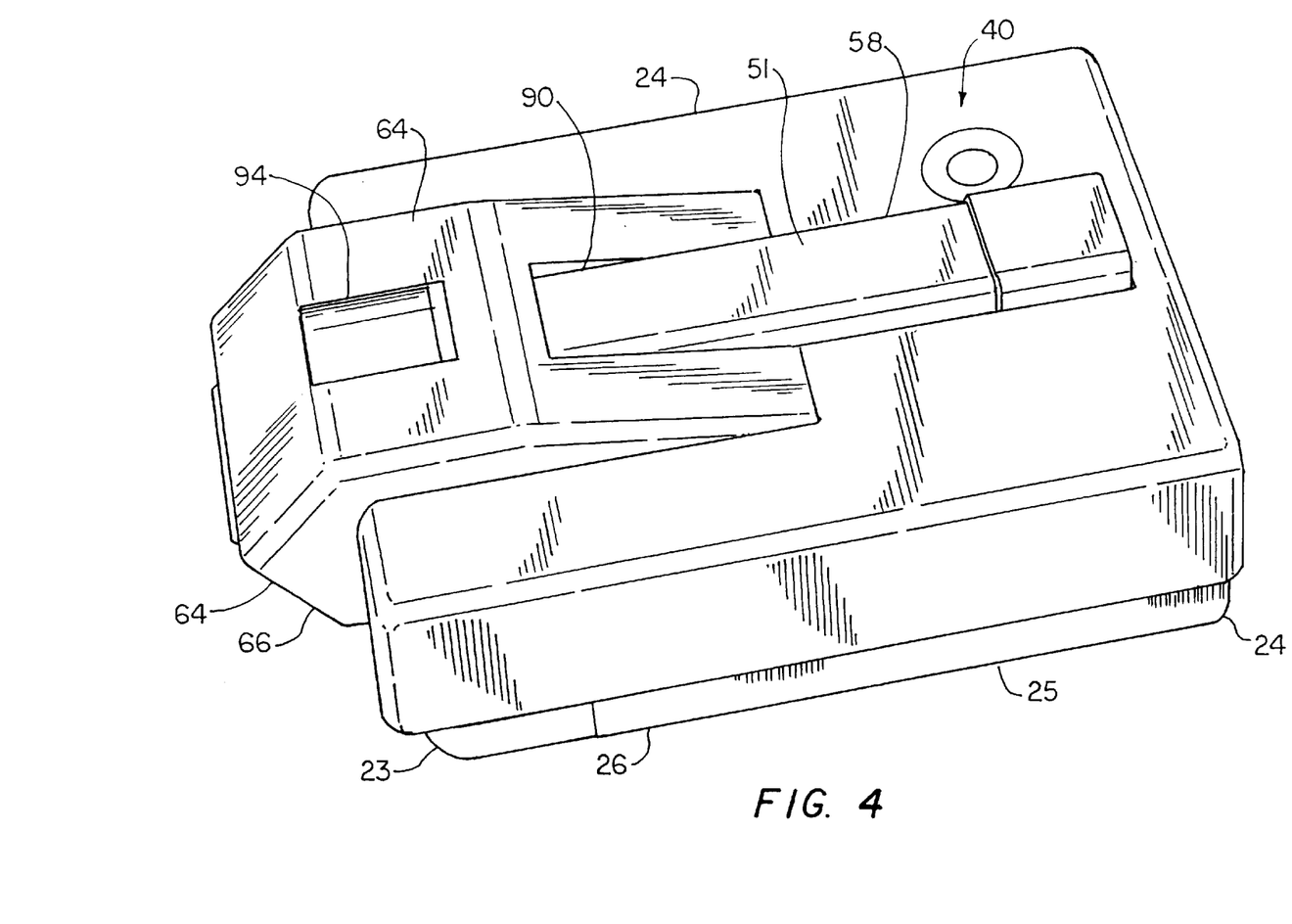
FIG. 4 is a schematic view of a folding camera constituting another embodiment of the present invention and shown in the unfolded position.

Located above upper housing 40 is a viewfinder assembly 50 having a housing 51 which extends generally in the forward-rearward direction and is generally parallel to the upper housing 40 and the base housing 21 as best shown in FIGS. 1 and 3. The housing 51 includes a viewfinder objective lens 52 in its front end, an eye lens 54 in its rear end and an eyecup 56. The viewfinder housing 51 is movable between a folded inoperative position shown in FIGS. 2 and 4 where it is received in a nested relationship relative to a passage or recess 58 formed in the upper housing 40; as best shown in FIG. 3, and an unfolded or erect operative position shown in FIGS. 1 and 3 where it is projected above the upper housing. The linkage means or mechanism 48 includes a pair of rear mounting link 62 on opposite lateral sides of the housing and are employed to pivotally mount the viewfinder assembly 50 as will be described in more detail below. This linkage mechanism 48 maintains the viewfinder housing 51 in generally parallel planes as it moves between the folded and unfolded positions as is the case with the upper housing 40 during its movement between folded and unfolded positions. The viewfinder housing 51 has a generally elongated rectangular configuration which matches the elongated rectangular passage formed in the upper housing 40 to accommodate the viewfinder housing in a compact manner as shown in FIG. 4. When the viewfinder housing 51 is in the folded position shown in FIG. 2, the rear end thereof lies closely adjacent the rear end of the upper housing 40 and base housing 21 so as to provide a compact arrangement.

As best shown in FIG. 3, the flash unit generally designated 64 has a generally rectangular shape in plan view and terminates at the forward end in an enlarged section 66 which houses the strobe 68. The rear end of the flash unit 64 in the preferred embodiment shown is fixed or otherwise connected to the rear mounting wall 46 so as to move therewith during folding and unfolding of the upper housing 40. The flash unit 64 is dimensioned and configured such that in the folded position, it closely overlies the front half section of the upper housing 40 as shown in FIG. 2. In addition, the enlarged front flash section 66 projects downwardly over the front end of the upper housing 40 to cover the objective lens 42 as best shown in FIG. 2.

In the specific embodiment shown in FIGS. 1–3, the viewfinder housing 51 is pivotally mounted to the upper housing 40 by the rear pivoting wall 46 connected by pivot 70 to the front end of the viewfinder housing as shown in FIG. 1. Additionally, the viewfinder housing 51 is mounted by the rear links 62 having their lower ends pivotally connected by pivots 72 to the rear end of upper housing 40 and having their upper end pivotally connected by pivots 74 to the viewfinder housing at a location intermediate the ends thereof. In addition to being mounted by means of the links 46 and 62, the upper housing 40 is mounted by a pair of front links 76 with respect to base housing 21. Each of the front links 76 is pivoted by pivots 78 at their lower end to base housing 21 and at its upper end by pivots 80 to the forward end portion of upper housing 40 adjacent the lens 42. In this preferred embodiment, two front links 76 are employed on opposite sides at the front end of viewfinder housing 40 although only one link 76 could be used. Similarly although two links 62 are used in the shown embodiment on opposite lateral sides of the viewfinder housing 51 as shown in FIG. 3 only one need be provided. If desired, a support strut 82 may be pivotally mounted at pivot 84 to upper housing 40 so that when the upper housing is in the unfolded position, the strut 82 engages base housing 21 as shown in FIG. 1 to further ensure adequate support for the upper housing 40.

In order to provide a light-tight exposure chamber surrounding the optical path, a bellows 86 is provided between the upper and lower housings 21, 40 and rear wall link 46. The upper end of bellows 86 is secured to the upper housing 40 and the rear wall link 46, and the lower end of the bellows is secured to the base housing 21 in any suitable manner. Although in the preferred embodiment, the rear wall mounting link 46 is pivotally connected to the base housing 21 at two locations as shown in FIG. 3, the rear wall 46 extends transversely between the opposite sides of bellows 86 to form part of the exposure chamber with bellows 86 and housings 21 and 40.

When the camera is in the folded inoperative position shown in FIG. 2, all of the basic parts described, namely, the upper and base housings, the viewfinder housing, and the flash unit extend in generally parallel planes one above the other in nested fashion to form a highly compact structure. Moreover, the front strobe section 66 of the flash unit 64 overlies the front end of the upper housing 40 to cover lens 42. When the camera is unfolded to the erect position shown in FIG. 2, the links 46, 76 and 62 will pivot in a clockwise direction as viewed in FIG. 1, and the upper housing 40 and viewfinder housing 51 will also pivot clockwise as they also undergo translatory motion rearwardly of the base housing 20 while remaining in planes generally parallel to each other and the base housing due to the novel linkage arrangement described above. Since the flash unit 64 is fixed to rear wall link 46, it will rotate therewith into the raised position shown in FIG. 1. The linkage arrangement provided can insure that the viewfinder is in a parallel relationship with the taking lens.

In the embodiment of FIGS. 1–3, the flash unit 64 is bifurcated at its rear end to provide an elongated longitudinally extending passage 90; as best shown in FIG. 3 for receiving and accommodating the viewfinder assembly 50; as shown in FIG. 4. In the embodiment shown in FIGS. 1–3, an enlarged front end 92 of upper housing 40 around the objective lens 42 is enlarged as shown in FIGS. 1 and 3, and the front end of viewfinder is provided with a passage as best shown at 94 in FIG. 3, for receiving and accommodating enlarged section 92 of the upper housing.

The linkage arrangement, as described and illustrated, serves to maintain the desired geometric operative relationship between the components throughout the erected and collapsed conditions of the camera while such components move between erect or collapsed conditions. In this embodiment, the linkage system maintains the desired generally parallel relationship between the upper and base housings, wherein the optical axis of the taking optics is generally parallel to the film plane, while the camera moves between erect or collapsed conditions. In this regard, by maintaining the generally parallel relationship, the incoming scene light rays traveling to the film and will always strike the mirror as intended regardless of whether or not the upper housing travels to a position higher or lower than the intended height with regard to the base housing. Thus, the maintenance of this parallel relationship means that it is less likely that manufacturing deviances, such as with the positioning of the stops, will adversely affect the path the incoming scene rays travel. With known folding cameras, the desired geometric relationship needed by the various components to provide the optimal path, must be reestablished everytime the camera is moved to the erect condition. Thus, if there are inaccuracies in the linkage of heretofore erecting systems, such inaccuracies will alter the travel of incoming light rays from the desired path. In accordance with the present invention however, such inaccuracies are significantly reduced because the objective lens always has its optical axis in the same or generally parallel relationship to the film plane carried in the base housing. Likewise, the operative relationship of viewfinder to the optical axis of the taking lens and film will be maintained substantially the same by reason of the present invention, thereby insuring desired registration between the scene as viewed in the viewfinder and the scene image transferred to the film.

Although not illustrated, the present invention contemplates that a separate viewfinder housing need not be employed and instead the viewfinder would be incorporated in the upper housing 40 which would therefore have in its front wall a viewfinder lens and in its rear wall an eyepiece lens. Such lenses would be in alignment on one side of the objective lens. In such an embodiment, it is of course not necessary to provide passages in the flash unit or upper housing to accommodate a separate viewfinder housing as in the embodiment of FIGS. 1–3.

Figure 5:
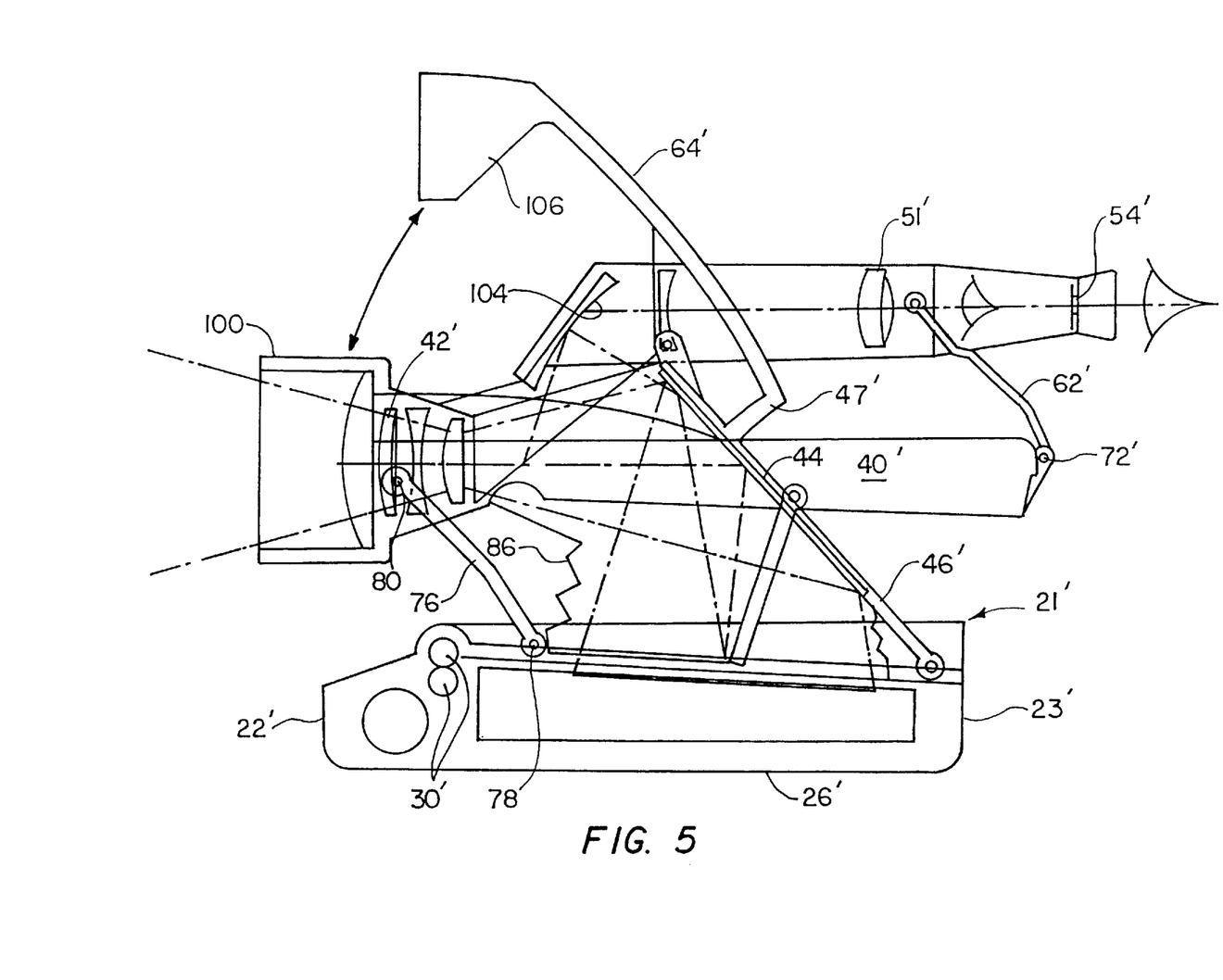
FIG. 5 is a side elevation diagrammatic view of a single lens reflex version of a folding camera having a zoom lens and depicted in an erect condition; and, FIG. 6 is an enlarged fragmented view illustrating the arrangement of the flash components in relationship to the zoom lens in the last noted embodiment.
Figure 6:
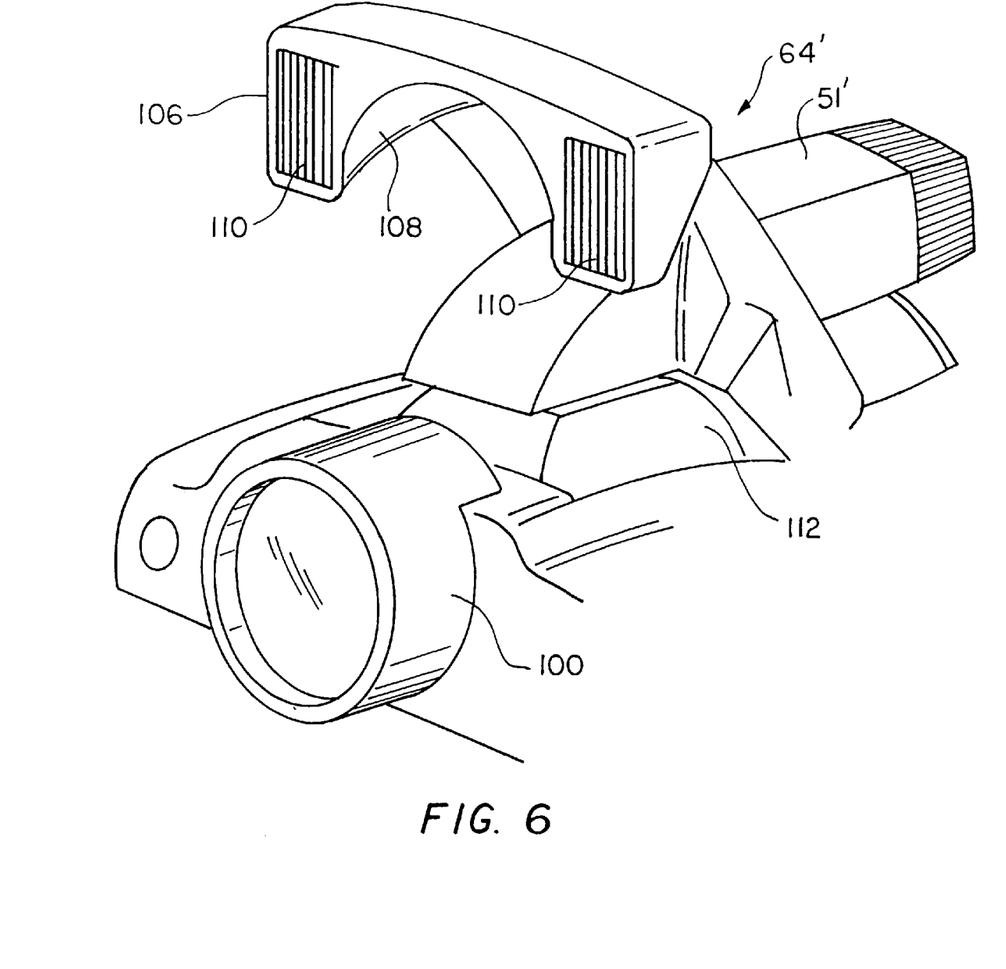

FIGS. 5 and 6 illustrate another preferred embodiment of the present invention. This embodiment is similar in construction as the previous but with the following changes. Structure of this embodiment which is similar to the last will be represented by the same reference numeral with, however, the addition of a prime marking. In this regard, there is provided a zoom lens 100 in the taking optical path and is included in a single lens reflex (SLR) camera of the self-developing type; such as the SX-70 camera commercially available from Polaroid Corporation. Because of the SLR camera, the viewfinder assembly instead of being separate from the objective lens is in the same optical path as is illustrated. In this regard, a curved mirror 104 is used to direct the rays of the scene from the mirror to the viewfinder assembly eyepiece lens. In this embodiment, an enlarged zoom lens 100 is placed over the objective lens. Because of the relatively enlarged circumference of the zoom lens 100, as illustrated, the strobe housing portion 106 has a curved bottom wall 108 that is configured to rest in complementary fashion, on the zoom lens 100 when the camera is in the folded condition (not shown). In this regard, a single or pair of strobes 110 on the strobe housing 106, or for that matter even a single strobe, is disposed laterally of the zoom lens 100 when the camera is in its folded condition. A bellows 112 is attached at ends to the upper and base housings and functions to prevent light from entering the camera when the housings.

Although several embodiments of the present invention have been shown and described above, it will be understood that the invention is not limited to these specific embodiments, but rather is defined by the appended claims.

What is claimed is:

1. A folding camera comprising in combination: a base housing having means for receiving film, an upper housing including an objective lens, linkage means mounting the upper housing to the base housing for movement wherein a plane containing the upper housing remains generally parallel to the base housing between an unfolded operative position spaced above the base housing and exposing the objective lens for taking a photograph, and a folded position closely overlying the base housing and projected forwardly from the unfolded position.

2. A folding camera comprising in combination: a base housing having means for receiving film, an upper housing including an objective lens, linkage means mounting the upper housing to the base housing for movement wherein a plane containing the upper housing remains generally parallel to the base housing for movement between an unfolded operative position spaced above the base housing and exposing the objective lens for taking a photograph, and a folded position closely overlying the base housing and projected forwardly from the unfolded position, and a flash unit associated with the upper housing and movable between an unfolded operative position projected above the upper housing and a folded inoperative position covering said objective lens in the upper housing.

3. The camera defined in claim 2 wherein said linkage means includes front and rear generally parallel links having opposite end portions pivotally connected to the base and upper housings, and wherein said flash unit is connected to said rear link.

4. The camera defined in claim 3 wherein said rear link includes a mirror overlying the film unit and providing an optical path from the objective lens to the film unit.

5. The camera defined in claim 4 further including a viewfinder, and means pivotally mounting the viewfinder to said upper housing for movement through a plane generally parallel to the upper housing between a folded inoperative position adjacent the upper housing and an unfolded operative position projected above the upper housing and exposing a front lens included in the viewfinder.

6. The camera defined in claim 5 wherein said means includes a viewfinder mounting link connected to and between the viewfinder and upper housing.

7. The camera defined in claim 2 further including a viewfinder, and means pivotally mounting the viewfinder to said upper housing for movement through a plane generally parallel to the upper housing between a folded inoperative position adjacent to the upper housing and an unfolded operative position projected above the upper housing and exposing a front lens included in the viewfinder.

8. The camera defined in claim 7 wherein said means includes a viewfinder mounting link connected to and between the viewfinder and upper housing.

9. The camera defined in claim 1 further including a viewfinder and a viewfinder linkage means mounting the viewfinder to the upper housing for movement through planes generally parallel to the upper housing between an unfolded operative position projected above the upper housing and exposing a front lens included in the viewfinder and a folded inoperative position in close association with the upper housing.

10. The camera defined in claim 9 wherein said viewfinder linkage means includes a link pivotally connected to the viewfinder and being pivotally connected to the upper housing.

11. The camera defined in claim 10 wherein said linkage means mounting the upper housing includes a first link pivotally connected to and between the base and upper housings.

12. The camera defined in claim 11 wherein said linkage means mounting the upper housing includes a second link pivotally connected to the base housing rearwardly of said first link.

13. The camera defined in claim 12 including a bellows fixed to and between said base and upper housings and defining with said housings and said second link an exposure chamber communicating with the objective lens.

14. The camera defined in claim 13 including a mirror on the second link in communication with the objective links to reflect light to a film unit in the base housing.

15. The camera defined in claim 9 including a flash unit associated with the upper housing and movable between an unfolded operative position projected above the upper housing and exposing a flash and a folded inoperative position overlying the upper housing, said flash unit having a passage receiving the viewfinder.

16. The camera defined in claim 14 including a flash unit pivotally mounted to the upper housing and pivotally connected to said second link.

17. The camera defined in claim 16 wherein said flash unit blocks said objective lens when the flash unit is in said folded position.

18. A folding camera comprising in combination: a base housing having means for receiving film, an upper housing extending generally parallel to said base housing and having an objective lens facing forwardly of the camera, means mounting the upper housing to the base housing for movement between a folded inoperative position closely overlying the base housing and an unfolded operative position projected above the base housing wherein a plane containing the upper housing remains generally parallel to the base housing during the movement of the upper housing for establishing an optical path from the objective lens to the film, a viewfinder located above said upper housing and extending generally parallel thereto, and means mounting said viewfinder for movement between a folded inoperative position adjacent the upper housing and an unfolded operative position projected above the upper housing for exposing a viewing lens located in the viewfinder.

19. The camera defined in claim 18 further including a flash unit connected to the upper housing for movement between a folded inoperative position extending over the upper housing in generally parallel relationship thereto and an unfolded operative position projecting above the upper housing, said flash unit and said upper housing having a passage receiving said viewfinder in their folded positions.

20. The camera defined in claim 19 wherein said flash unit has a front section overlying the objective lens when the flash unit and said upper housing are in their folded positions.

\* \* \* \* \*